Jan. 4, 1955 W. S. BROFFITT 2,698,872
THERMOCOUPLE MOUNT
Filed Aug. 30, 1951

Inventor
Wilgus S. Broffitt
By Willits, Helwig & Baillio
Attorneys

United States Patent Office 2,698,872
Patented Jan. 4, 1955

2,698,872
THERMOCOUPLE MOUNT

Wilgus S. Broffitt, Indianapolis, Ind., assignor to General Motors Corporation, Detroit, Mich., a corporation of Delaware Application August 30, 1951, Serial No. 244,426

15 Claims. (Cl. 136—4)

This invention relates to temperature sensing means, of a type specially suitable for use in gas turbine engines and the like, and, more particularly, to such means for measuring the average temperature of an exhaust gas stream in engines of this character.

It is customary practice to mount thermocouples in the exhaust duct of gas turbine engines to provide a warning if the gases issuing from the turbine reach an excessive temperature, and, in some cases, to operate automatic controls. Individual thermocouples inserted through the outer wall of the exhaust duct at circumferentially spaced points have generally been employed. However, as such thermocouples measure the temperature only at the thermocouple junction, the average of the thermocouple readings often yields a false temperature indication because of the non-uniform temperature of the exhaust gases discharging through the exhaust duct.

Accordingly, it is an object of the present invention to provide an improved temperature sensing means that enables the accurate measurement of the average temperature of an exhaust gas stream. Other objects of the invention are to provide an improved temperature sensing means that is light in construction, simple to install, and dependable in operation.

In accordance with the invention, the average temperature of an exhaust gas stream is accurately measured by means of a thermocouple mount in the form of a conducting ring or band of composite metal of good thermal conductivity and heat resistivity. The band is circumferentially disposed about the duct intermediate the ends thereof in the path of the gas stream and is preferably radially supported from the wall of the duct by a plurality of spaced tubular support struts each of which houses the leads to one of a plurality of thermocouples the junctions of which are embedded in the conducting band. Such an arrangement tends to equalize hot spots caused by uneven temperature distribution and to average the temperature circumferentially of the duct and thus enables a more accurate measurement of the average temperature of an exhaust gas stream than can otherwise be obtained.

These and other objects and features together with the advantages attending the invention will be more apparent from a consideration of the following detailed description taken together with the accompanying drawings wherein.

Figure 1:
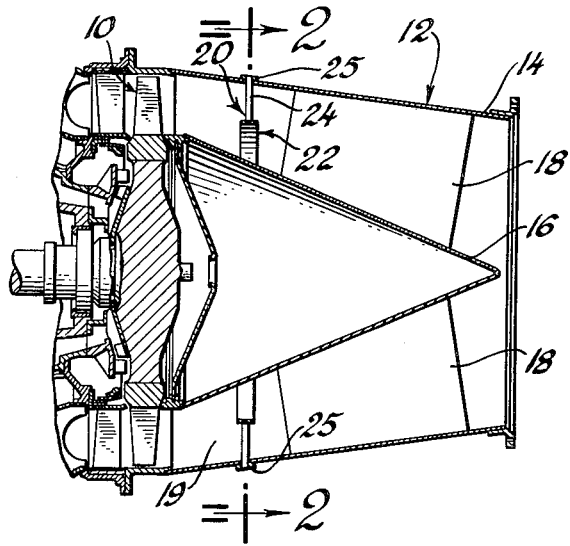
Fig. 1 is a longitudinal sectional view of an exhaust duct of an aircraft gas turbine engine including temperature sensing means in accordance with the preferred embodiment of present invention.

Referring to the drawings, only the aft section comprising the turbine 10 and exhaust duct 12 of a gas turbine aircraft engine is illustrated in Fig. 1, the forward and mid-sections including the compressor and combustion apparatus, respectively, thereof being omitted in the interest of clarity of the drawings and conciseness of the specification.

Structurally, the exhaust duct 12 is comprised of a substantially cylindrical outer casing 14 concentrically disposed about an inner cone 16 which is supported principally from the outer casing by a plurality of faired support struts 18 as shown in Fig. 1. The outer casing and inner cone thus define a diverging annular passage 19 for the hot turbine exhaust gas stream discharging therethrough.

Figure 2:
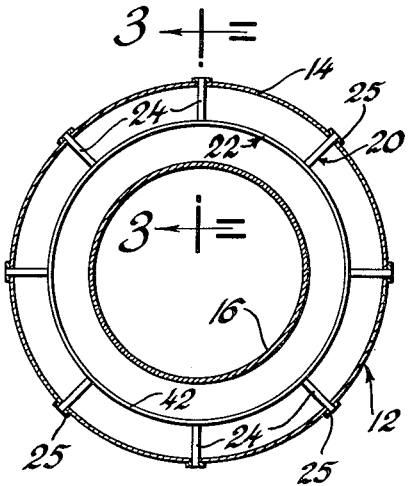
Fig. 2 is a transverse sectional view of the structure of Fig. 1 taken on the plane 2—2 thereof.
Figure 3:
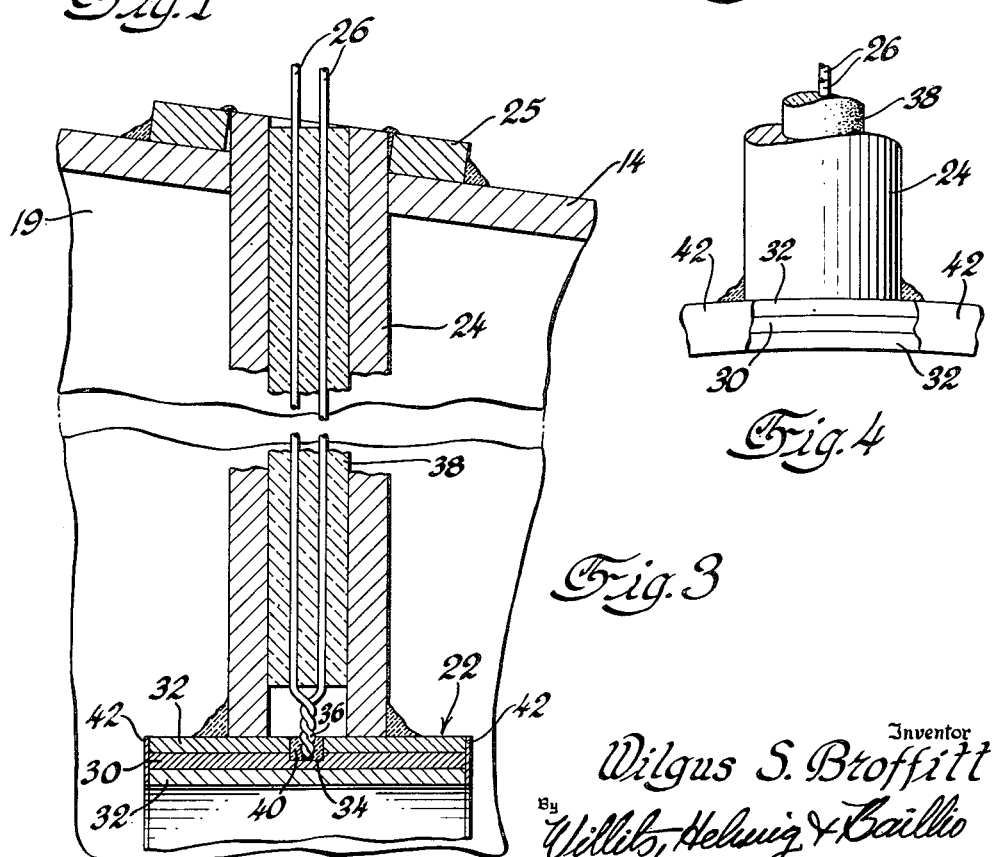
Fig. 3 is an enlarged fragmentary sectional view of a part of Fig. 1 taken on the plane 3—3 of Fig. 2.
Figure 4:
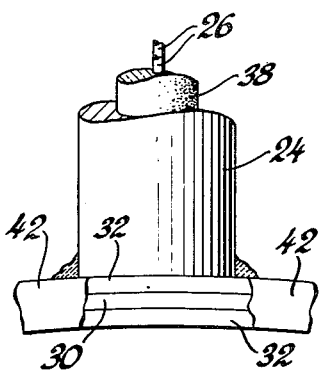
Fig. 4 is an enlarged fragmentary view of a part of Fig. 2.

In accordance with the present invention an accurate measurement of the average temperature of the exhaust gas stream is obtained by means of a thermocouple mount 20 comprising a thermally-conductive composite metal strip preferably in the form of a ring or band 22 which is disposed in the exhaust duct 12 and is radially supported from the outer casing 14 thereof by a plurality of tubular support struts 24. As shown in Fig. 2 the support struts 24 are circumferentially arranged at equally spaced points about the interior of the outer casing 14 and additionally serve to house the leads 26 of respective ones of a plurality of thermocouples 36 that are inserted therein from without the exhaust casing as shown in Fig. 3. The inner extremities of the struts are welded to the outer peripheral surface of the band 22, and the outer extremities thereof, shown extending slightly through aligned openings in the outer casing 14, are welded to a collar 25 welded to the outer casing.

In the preferred embodiment of the invention the band is composed of a composite metal strip exhibiting good thermal conducting and heat resisting properties such, for example, as Rosslyn Metal, which is constituted by an intermediate layer 30 of copper, which has high heat conductivity, clad on both sides with heat resisting layers 32 of Inconel, the latter being an alloy containing approximately 78% nickel, 14% chromium and the balance substantially all iron. The enlarged surface area afforded by the use of a flat metal band enables a more effective pick-up of heat and simulates the effect of a continuous thermocouple or infinite number of thermocouples disposed circumferentially about the interior of the duct.

By way of example, the dimensions of the cross-section of the Rosslyn Metal band may be ½ inch by ¹⁄₁₆ inch, and the intermediate layer 30 of copper may form approximately 30% of the cross-sectional area of the band.

A plurality of shallow recesses 34, one of which is shown in the enlarged detailed view of Fig. 3, are provided in the outer surface of the Rosslyn Metal band 22 so as to permit the tip of the junction 36 of each thermocouple to be preferably embedded in the intermediate copper layer of the band wherein it is held in position with weld material 40 as shown. It is desirable that the thermocouple leads 26 be well insulated in the support struts 24 and for this purpose the leads may be enclosed in a heat resisting insulating core 38 of ceramic or other material fitted in the interior of each support strut where the thermocouple junctions and leads are well protected against the impact of the hot gases. The copper of the Rosslyn Metal provides good heat conductivity which is not a characteristic of most alloys which are intended to resist high temperatures. The Inconel protects the copper against the hot gas. To protect the exposed edges of the Rosslyn Metal band against the impact of hot gases, the edges are calorized by applying thereto a high temperature protective coating 42 having an aluminum base as shown on Fig. 3.

In some applications of the invention, where temperatures are lower, the strip 22 might be composed of a single metal of good conductivity. Composite metal strips other than Rosslyn Metal might be used, although this appears to be the most suitable material commercially available.

Although the band 22 has been shown and described herein in the form of a continuous ring, it is apparent that the band may be formed of a plurality of separated strips of Rosslyn Metal, if desired, and that instead of supporting the band from the walls of the outer exhaust casing 14, the band could be mounted against the wall of the casing.

Although one specific embodiment of the invention has been described with reference to a particular application thereof, the invention is susceptible of numerous other arrangements and applications as will be apparent to those skilled in the art.

What is claimed is:

1. In combination, a fluid duct, an extended thermocouple mount disposed within said duct, and a plurality of thermocouples mounted at spaced points along the length of said thermocouple mount, the junctions of said thermocouples being embedded in said thermocouple mount, said thermocouple mount being possessed of a high thermal conductivity along the length thereof for equalizing the temperature of said thermocouples.

2. In combination, a walled exhaust nozzle constituting a passage for an engine exhaust gas stream, a ring-like thermocouple mount formed of a composite metal band circumferentially mounted in said nozzle intermediate the ends thereof in the path of said stream, said band comprising an intermediate layer of metal of high thermal conductivity clad on both sides with a layer of metal of high heat resistivity, a plurality of spaced tubular support struts extending between the walls of said nozzle and said thermocouple mount, and a plurality of thermocouples each housed in respective ones of said support struts, the junctions of said thermocouples being embedded in said composite metal band.

3. In combination, a walled exhaust nozzle constituting an annular passage for an exhaust gas stream, a ring-like thermocouple mount formed of a continuous composite metal band circumferentially mounted about said nozzle intermediate the ends thereof in the path of said stream, said band comprising an intermediate layer of copper clad on both sides with a heat resisting high nickel alloy, a plurality of equally spaced tubular support struts radially disposed between the walls of said nozzle and said thermocouple mount, and a plurality of thermocouples each housed in respective ones of said support struts, the junctions of said thermocouples being in contact with said composite metal band.

4. In apparatus for measuring the average temperature of a fluid medium flowing through a walled passage, the combination of an extended thermocouple mount within said passage and a plurality of thermocouples extending into said passage and mounted at spaced points along the length of said thermocouple mount, said thermocouple mount being of high thermal conductivity and of continuous unbroken formation along the length thereof for equalizing the temperature of said thermocouples, the junctions of said thermocouples being embedded in said thermocouple mount.

5. In apparatus for measuring the average temperature of a fluid medium flowing through a walled passage, the combination of an extended thermocouple mount within said passage and a plurality of thermocouples extending into said passage and mounted at spaced points along the length of said thermocouple mount, said thermocouple mount comprising a composite laminated metal band including a layer of metal of high thermal conductivity along the length of the mount for equalizing the temperature of said thermocouples.

6. In apparatus for measuring the average temperature of a fluid medium flowing through a walled passage, the combination of an extended thermocouple mount within said passage and a plurality of thermocouples extending into said passage and mounted at spaced points along the length of said thermocouple mount, said thermocouple mount comprising a laminated metal band formed by an intermediate layer of metal possessed of high thermal conductivity along the length of said mount and clad on both sides with a layer of a heat resisting metal alloy.

7. In apparatus for measuring the average temperature of a fluid medium flowing through a walled passage, the combination of a continuous thermocouple mount within said passage and a plurality of thermocouples extending into said passage and mounted at spaced points around the periphery of said thermocouple mount, said thermocouple mount comprising a laminated metal band formed by an intermediate layer of metal possessed of high thermal conductivity about the length of said mount and clad on both sides with thin layers of a heat resisting metal alloy, the junctions of said thermocouples being embedded in the said intermediate layer of said band.

8. In apparatus for measuring the average temperature of a fluid medium flowing through a walled passage, the combination of an extended thermocouple mount within said passage and a plurality of thermocouples extending into said passage and mounted at spaced points along the length of said thermocouple mount, said thermocouple mount comprising a laminated composite metal band comprised of an intermediate layer of thermally conductive metal covered on both sides with a heat resisting metal alloy, said mount being characterized by high thermal conductivity in a direction extending laterally through the laminations thereof and along the length thereof.

9. In combination, a walled exhaust nozzle constituting a passage for an engine exhaust gas stream, a ring-like thermocouple mount formed of a composite metal band circumferentially mounted in said nozzle intermediate the ends thereof in the path of said stream, said band comprising an intermediate layer of metal of high thermal conductivity along the length thereof and clad on both sides with a thin layer of metal alloy of high heat resistivity, a plurality of spaced tubular support struts extending between the walls of said nozzle and said thermocouple mount, a plurality of thermocouples housed in respective ones of said support struts and having the junctions thereof embedded in said thermocouple mount, and a high temperature protective coating covering the edges of said thermocouple mount exposed to said exhaust gas stream.

10. In combination, a walled fluid duct constituting a passage for a fluid medium passing therethrough, an extended thermocouple mount within said passage and comprising a strip of metal of high heat resistivity one side of which is in thermal contact with said fluid medium and a corresponding strip of metal of high thermal conductivity along the length thereof in juxtaposition with the other side of said metal strip of high heat resistivity, and at least one thermocouple extending into said fluid duct and having the junction thereof embedded in said metal strip of high thermal-conductivity.

11. In combination, a walled exhaust duct constituting an annular passage for an exhaust gas stream discharging therethrough, a ring-like thermocouple mount within said duct and comprising a continuous metal band of high heat resistivity the inner side of which is exposed to said gas stream and a continuous metal band of high thermal conductivity around the entire length thereof in juxtaposition with the other side of said band of high heat resistivity, and a plurality of thermocouples extending into said duct and having the junctions thereof embedded in said band of high thermal conductivity.

12. In combination, a walled exhaust duct constituting an annular passage for an exhaust gas stream discharging therethrough, a ring-like thermocouple mount within said duct and comprising a continuous metal band of high heat resistivity the outer side of which is exposed to said gas stream and a continuous metal band of high thermal conductivity around the entire length thereof in juxtaposition with the other side of said band of high heat resistivity, and a plurality of thermocouples extending into said duct and having the junctions thereof embedded in said band of high thermal conductivity.

13. In apparatus for measuring the average temperature of a fluid medium flowing through a walled passage, the combination of a continuous ring-like thermocouple mount within said passage and a plurality of thermocouples extending into said passage and mounted at spaced points around the periphery of said thermocouple mount with the junctions of said thermocouples embedded in said thermocouple mount, said thermocouple mount being of high thermal conductivity and of continuous unbroken formation around the length thereof for equalizing the temperature of said thermocouples.

14. In combination, a walled fluid duct, an extended thermocouple mount disposed within said duct, a plurality of support struts extending between the walls of said duct and said thermocouple mount and a plurality of thermocouples mounted at spaced points along the length of said thermocouple mount, the junctions of said thermocouples being in contact with said thermocouple mount, said thermocouple mount being possessed of a high thermal conductivity along the length thereof for equalizing the temperature of said thermocouples.

15. In combination, a walled fluid duct, an extended thermocouple ring mount disposed within said duct spaced from the walls of said duct, a plurality of support struts extending between the walls of said duct and said thermocouple mount and a plurality of thermocouples mounted at spaced points along the periphery of said thermocouple mount, the junctions of said thermocouples being in contact with said thermocouple mount, said thermocouple mount being possessed of a high thermal conductivity and being of continuous unbroken formation along the length thereof for equalizing the temperature of said thermocouples.

References Cited in the file of this patent

UNITED STATES PATENTS

| Number | Name | Date |
|---|---|---|
| 660,305 | Oliver | Oct. 23, 1900 |
| 2,058,491 | Noble | Oct. 27, 1936 |
| 2,156,853 | Huggins | May 2, 1939 |
| 2,290,902 | Wiegand | July 28, 1942 |
| 2,455,654 | Browne | Dec. 7, 1948 |
| 2,463,566 | Saldin | Mar. 8, 1949 |

FOREIGN PATENTS

| Number | Country | Date |
|---|---|---|
| 14,234 of 1911 | Great Britain | June 27, 1912 |